March 5, 1963 — W. H. WILLATTS — 3,079,649
BEAMS AND BUILDING COMPONENTS
Filed June 12, 1959 — 5 Sheets-Sheet 1
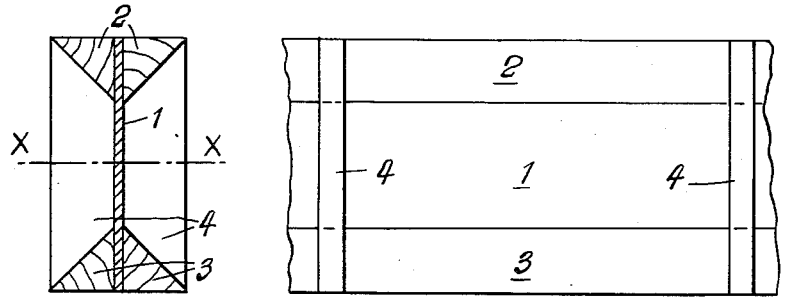
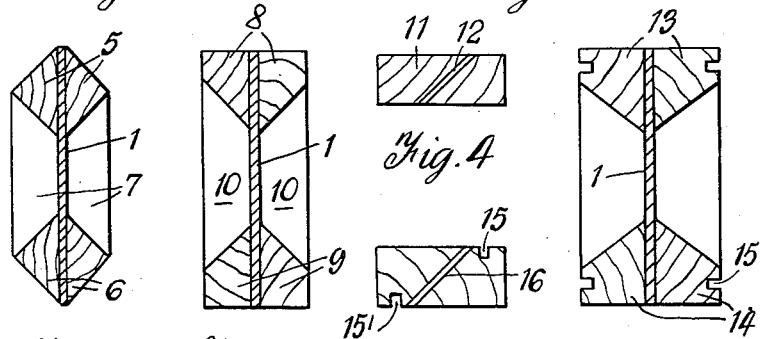
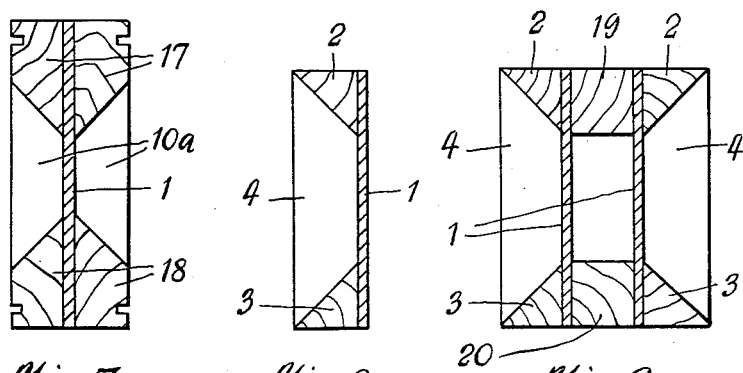

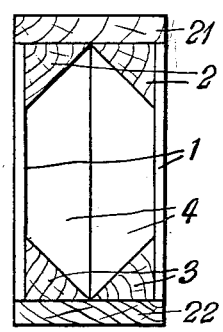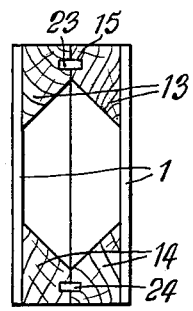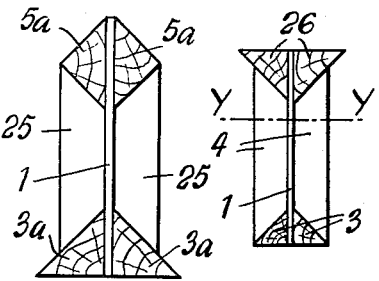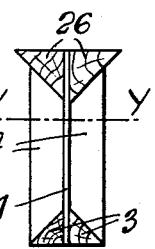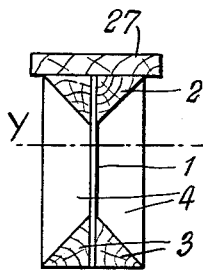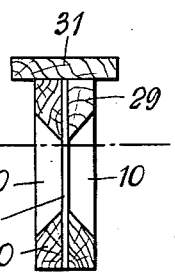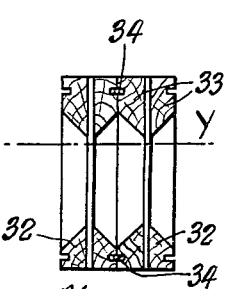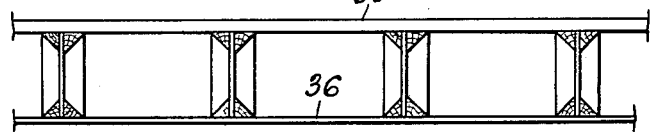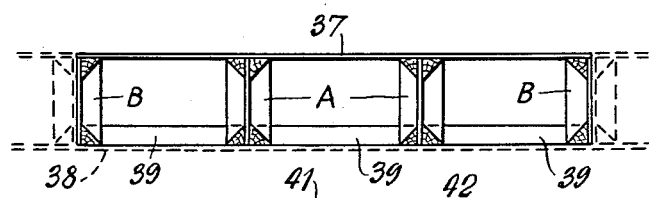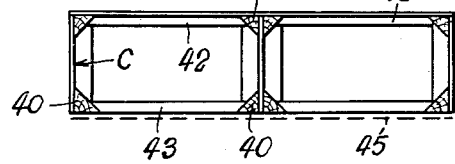

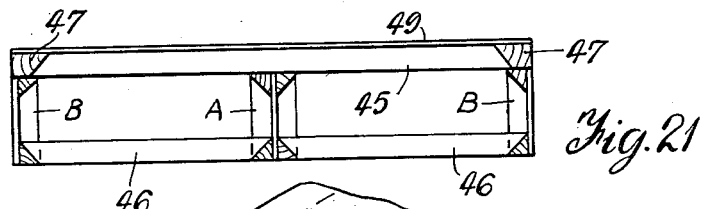
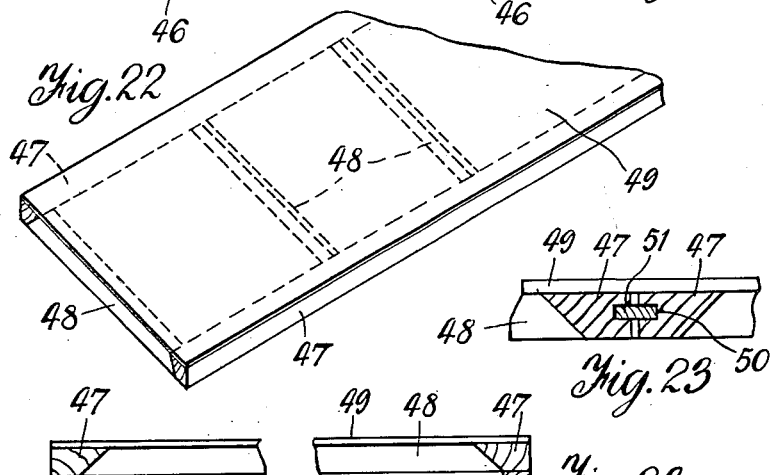
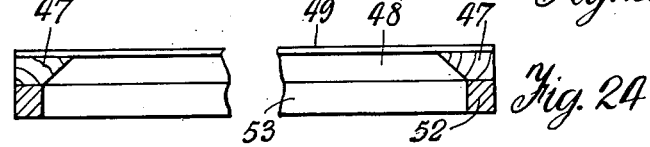
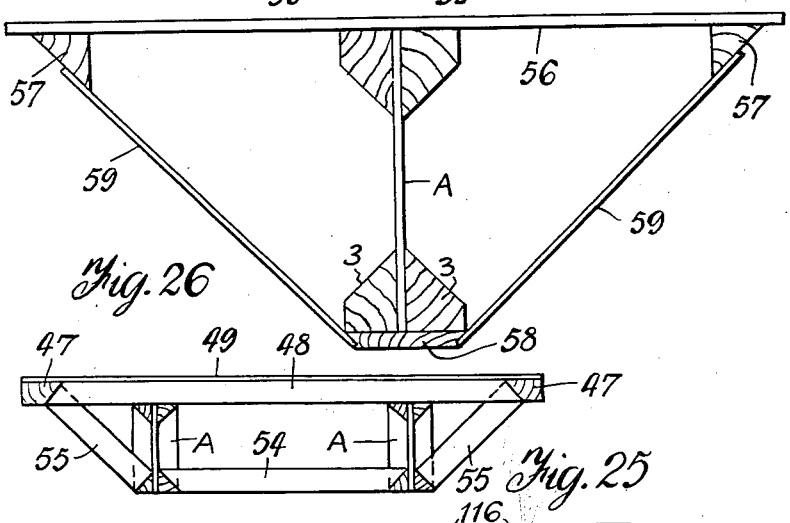
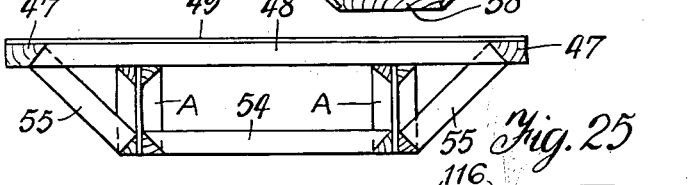
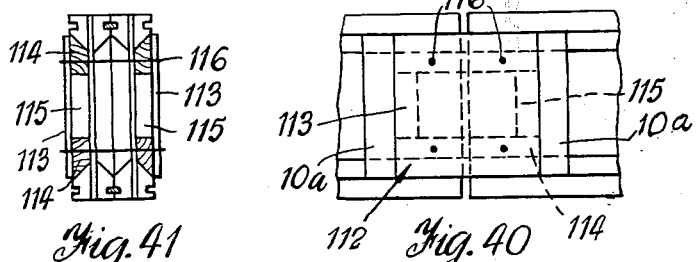

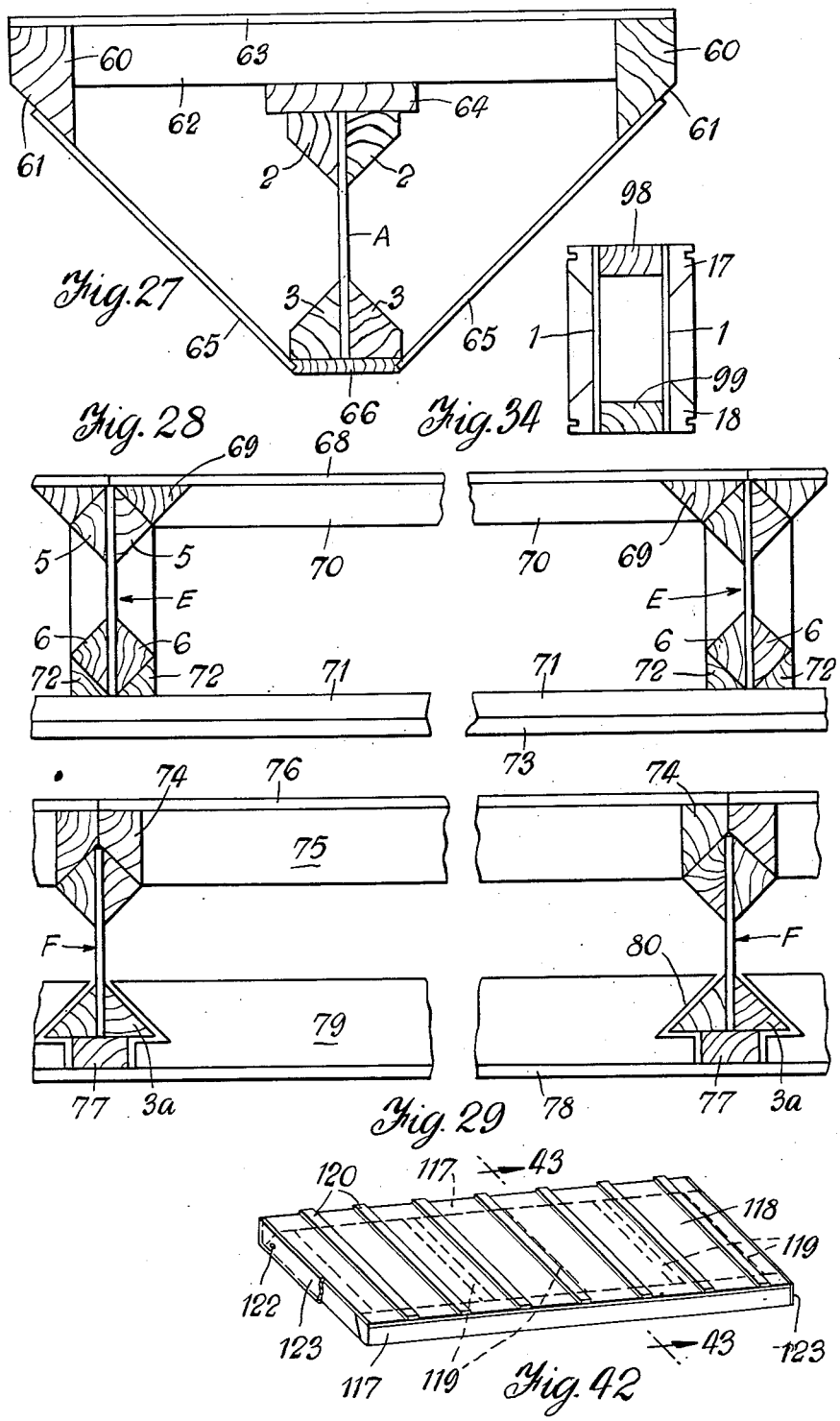

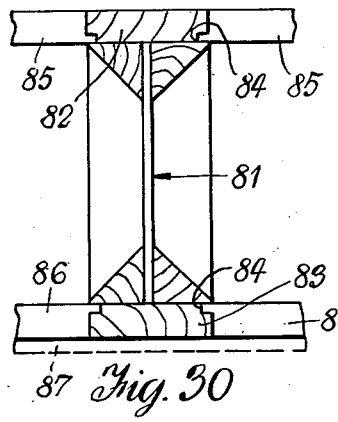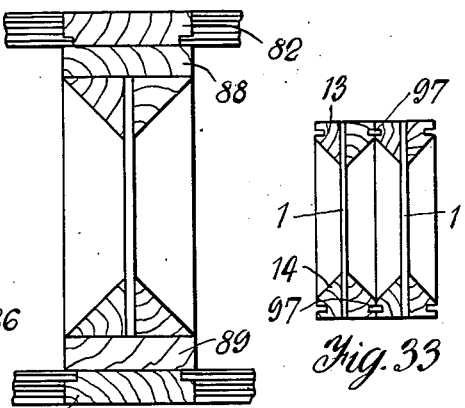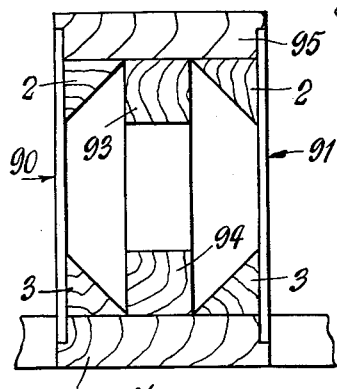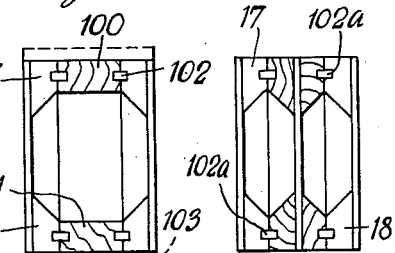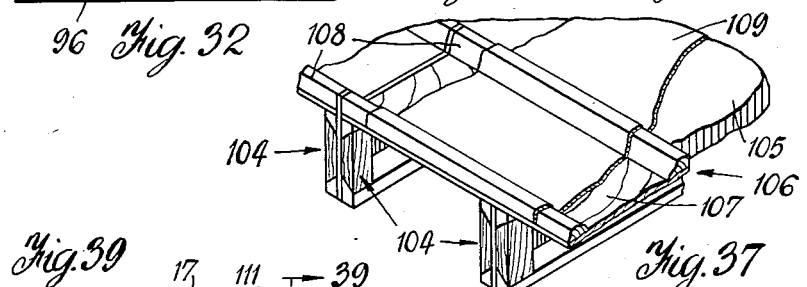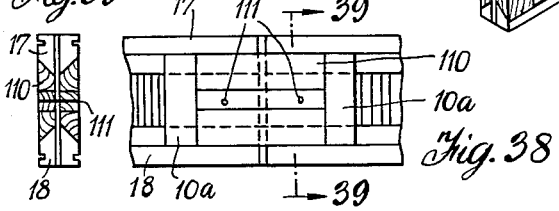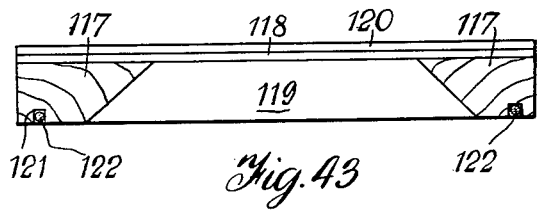

United States Patent Office 3,079,649
Patented Mar. 5, 1963

3,079,649
BEAMS AND BUILDING COMPONENTS
William Henry Willatts, 18 Vineyard Hill Road,
Wimbledon, London SW. 19, England
Filed June 12, 1959, Ser. No. 820,034
Claims priority, application Great Britain June 17, 1958
2 Claims. (Cl. 20—.5)

This invention relates to beams and the components assembled with such beams.

In accordance with the invention there is provided a beam for a building or other structure, said beam comprising a longitudinally extending web of plywood or other sheet material having on one side face, or on each of its side faces, reinforcing members formed of timber and extending along and secured to the web, the reinforcing members presenting on a side face of the web, lateral flange surfaces extending longitudinally of the web.

The reinforcing members may be triangular or of trapezoidal shape in cross-section so that two of such members can be formed by a diagonal or an inclined cutting along a length of standard timber which is rectangular in cross-section and generally square.

The component parts of the beam may all be formed from wood, the web being of ply-wood and the reinforcing members cut from lengths of solid or laminated timber so that the beam constitutes a fabricated light-weight timber structure capable of supporting relatively heavy loads. The load bearing properties of a beam may, for a given length or span, be increased by increasing the depth or transverse width of the web.

A composite beam can be produced by securing together in back-to-back relation, two webs each having on one side a pair of longitudinally extending reinforcing members, the webs being so arranged that the reinforcing members carried thereby provide lateral flange surfaces extending along the opposite sides of the composite beam.

The invention further provides a preformed building unit or component comprising a generally rectangular frame or panel, a beam extending along the frame or panel and disposed intermediate the longitudinal edges thereof, said beam having a longitudinal web substantially perpendicular to the plane of said frame or panel, and reinforcing members of timber secured to opposite side faces of the web and providing lateral flange surfaces along the longitudinal edges of said web, said frame or panel being secured to the adjacent flange surfaces of the beam and the two opposite longitudinal marginal portions of said frame or panel being secured to half-beam elements which are arranged with the webs thereof substantially perpendicular to the plane of the frame or panel so as to define the two opposite longitudinal side walls of the unit or component, said unit or component comprising also transverse bracing elements spaced apart along the length of the beam and half-beam elements and arranged to maintain the webs of said beam and half-beam elements substantially parallel to each other and perpendicular to the frame or panel.

For a better understanding of the invention and to show how it may be carried into effect, embodiments thereof will now be described, by way of example, with reference to the accompanying drawings, in which:

FIGURE 1 is a diagrammatic cross-sectional view of a beam according to one embodiment, FIGURE 1A is a fragmentary side elevation corresponding to FIGURE 1, FIGURES 2 and 3 are views similar to FIGURE 1 but illustrating modified embodiments, FIGURE 4 is a detail illustrating the formation of parts employed in the embodiment of FIGURE 3, FIGURE 5 is a view similar to FIGURE 1, of a further modified embodiment, FIGURE 6 is a detail illustrating the formation of parts employed in the embodiment of FIGURE 5, FIGURES 7 to 17 are cross-sectional views illustrating respectively further embodiments, FIGURE 18 is a cross-sectional view illustrating diagrammatically a practical application of beams according to FIGURE 1, FIGURE 19 is a cross-sectional view illustrating diagrammatically a building unit or component incorporating beams according to FIGURES 1 and 8, FIGURES 20 and 21 are cross-sectional views illustrating further building units or components, FIGURE 22 is a perspective view of part of the unit or component shown in FIGURE 21, FIGURES 23 and 24 are detail views illustrating modifications of the embodiment of FIGURES 21 and 22, FIGURES 25 to 27 are cross-sectional views of further building units or components incorporating beams according to FIGURE 1, FIGURE 28 is a diagrammatic cross-sectional view of a structure incorporating beams according to FIGURE 2, FIGURE 29 is a view similar to FIGURE 19 of a structure incorporating beams according to FIGURE 12, FIGURES 30 and 31 are cross-sectional views illustrating alternative structures incorporating beams according to FIGURE 1, FIGURES 32 to 36 are cross-sections illustrating composite beams according to further embodiments of the invention, FIGURE 37 is a fragmentary perspective view illustrating a roof and gutter structure, FIGURES 38 and 39 show respectively side and cross-sectional views of a coupling between two aligned beams, FIGURES 40 and 41 are views similar to FIGURES 38 and 39 respectively and illustrating an alternative coupling between two beams, FIGURE 42 is a perspective view illustrating a structure according to a further embodiment, and FIGURE 43 is a cross-section along the line 43—43 of FIGURE 42.

Referring to the drawings, the beam illustrated in FIGURES 1 and 1A comprises a fabricated light-weight timber element intended for use in a roof, ceiling or other structural part of a building. The beam comprises a web 1 of sheet material, such as ply-wood, which extends longitudinally from end-to-end of the beam. To each side face of the web 1 there are secured two timber battens 2 and 3 which extend from end-to-end of the web along the upper and lower longitudinal marginal portions thereof so that the upper pair of battens 2 present lateral flange surfaces substantially flush with the upper edge of the web and perpendicular to the plane of the web and the lower pair of battens 3 present similar flange surfaces along the lower edge of the web. The upper and lower battens are triangular in cross-section and may conveniently be formed by diagonal longitudinal cutting of a length of timber which is square in cross-section. This provides economy in material but nevertheless, each triangular sectioned batten will have a gluing surface for fixing to and reinforcing the web, which surface will be at least as broad as any of the surfaces of the square sectional timber from which the batten is cut. The battens are secured to the web as by gluing, or by glued and nailed joints, and serve to reinforce the web against shearing and bending. The beam may be further strengthened by the provision, at opposite sides of the web, of vertical or transverse stiffeners as shown at 4 formed of timber or ply-wood and shaped for being secured, as by glue, between the upper and lower battens in spaced apart relation along the length of the beam and substantially perpendicular to the web. The stiffeners 4 are of generally trapezoidal shape to provide inclined ends for engagement with the adjacent inclined faces of the reinforcing battens 2, 3.

The beam of FIGURE 2 is similar to that shown in FIGURE 1 and comprises a longitudinally extending web 1 which has secured to its opposite faces upper and lower pairs of battens 5, 6 which are similar in cross-section to battens 2, 3 of FIGURE 1, but which are so arranged that the faces thereof formed by the diagonal cuts, are secured to the web. The upper and lower flange faces of the battens 5, 6 are thus inclined with respect to the web. The beam of FIGURE 2 may also be provided along each side with longitudinally spaced stiffeners as shown at 7, similar to the stiffeners 4 of FIGURE 1.

In the beam of FIGURE 3, the web 1 has applied to its opposite sides, longitudinally extending battens 8, 9 which are of generally trapezoidal shape in cross-section and which may be conveniently produced by the longitudinal cutting of a standard piece of timber substantially oblong rectangular in shape as shown at 11 in FIGURE 4, the longitudinal cut being made along an inclined line as indicated at 12 to produce two reinforcing battens of identical cross-section. The broader face of each batten 8, 9 is applied to the web and longitudinally spaced stiffeners 10 may be provided at each side of the web as in the aforedescribed embodiments.

The embodiment of FIGURE 5 comprises a beam, the longitudinal web 1 of which has applied to its opposite faces upper and lower pairs of reinforcing battens 13, 14 which are somewhat similar to the corresponding battens of the embodiment of FIGURE 3 and which are formed along their outwardly directed edge faces with longitudinal grooves 15 adapted to receive roof or ceiling panels, frame members or other parts of a building structure. Pairs of the reinforcing battens 13, 14 may be formed by the longitudinal cutting of a length of timber substantially as shown in FIGURE 6, the longitudinal cut being made along an inclined line as shown at 16. This again provides economy in material but nevertheless affords a relatively broad gluing surface along the batten for securing to and reinforcing the web.

The embodiment of FIGURE 7 comprises a beam which is almost identical with the beam of FIGURES 5 and 6, the main difference being that in FIGURE 7, the longitudinal web 1 has applied to its opposite side faces, upper and lower pairs of reinforcing battens 17, 18 which, although similar in shape to the corresponding battens 13, 14 of FIGURE 5, are of greater cross-sectional area and thus of heavier construction.

The beam of FIGURE 8 comprises a half-element having a longitudinal web 1 and upper and lower battens 2, 3 and longitudinally spaced stiffeners 4, at one side only of the web, the battens and the stiffeners being similar to those of the beam shown in FIGURE 1. Similar half-elements could be constructed with reinforcing battens and stiffeners corresponding to those of the beams already described with reference to FIGURES 2, 3, 5 and 7. The half-elements are such that they can be arranged in pairs to form a composite beam. In FIGURE 9, for example, two half-elements of the kind shown in FIGURE 8, are arranged back-to-back and secured together in spaced apart relation by longitudinal top and bottom continuous battens 19, 20 to form a hollow or box-like beam. In FIGURE 10, two of the half-elements of FIGURE 8 are arranged with the battens 2, 3 and stiffeners 4 thereof, in abutting relation, the two half-elements being secured together by additional top and bottom timber members or flange plates 21, 22 fixed throughout the length of the half-elements to the adjacent battens 2, 3 thereby to form a composite beam structure. FIGURE 11 illustrates a composite beam similar to that shown in FIGURE 10 but assembled from a pair of half-elements having reinforcing battens 13, 14 as in the beam of FIGURE 5. The half elements are glued together along the abutting faces of the upper and lower pairs of battens, the joints being located by insertion of hardwood tongues 23, 24 in the grooves 15 formed in the battens. The half-elements may also be employed, as hereinafter described, in the construction of building units or components of hollow or box-like form.

The beam of FIGURE 12 comprises a longitudinal web 1 having an upper pair of reinforcing battens 5a which in form and arrangement are similar to the battens 5 of the beam of FIGURE 2 and having a lower pair of battens 3a similar to and arranged in the same manner as the battens 3 of the beam shown in FIGURE 1. The beam of FIGURE 12 thus has an upper compression flange presenting inclined flange faces, and a lower tension flange presenting flange faces substantially flush with the lower edge of the web and perpendicular to the plane of the web. The beam may also be provided along opposite sides with longitudinally spaced stiffeners 25.

In the aforedescribed embodiments, the depth of the webs may be modified according to the intended span of the beams and the required load-bearing properties. Conveniently, the webs may be cut from standard sheets of ply-wood of between ¼ inch and ⅜ inch in thickness and the webs may have an overall depth of, for example, from 6 to 24 inches. If necessary, two or more lengths of ply-wood may be butt-joined together at the ends to form a web. The reinforcing battens of the embodiments of FIGURES 1, 2, 8, 9, 10 and 12 may be formed by the diagonal cutting of standard timber either 2 inches or 3 inches square, while the battens of FIGURES 3, 5 and 11 could be formed from standard timber measuring 3 inches or 4 inches wide by at least 1½ inches thick. The stiffeners may be cut from timber 2″ x 1″, and spaced 2 feet apart along the beams. As previously stated, the reinforcing battens 17, 18 of FIGURE 7 are similar in shape to, but of heavier construction than, the corresponding battens 13, 14 of FIGURE 5. Thus, the battens 17, 18 may conveniently be formed by the longitudinal cutting of lengths of timber measuring, for example, 6 inches in width and at least 1½ inches in thickness.

In the beams described with reference to FIGURES 1 to 7, the upper and lower lateral flanges are formed by longitudinal reinforcing battens which, in each case, are substantially identical so that the beam structures are symmetrical in form and may be regarded as having a neutral axis extending longitudinally for example, in a medial plane, as indicated by the line X—X in FIGURE 1. In most beam structures, the bending stress in compression is a limiting factor in relation to the load bearing properties of the structures. However, modifications may be made in each of the beams of FIGURES 1 to 7, in such a manner as to make the top flanges of heavier construction than the bottom flanges, thereby to raise the level of the neutral axis. The arrangement is then such that, when the beam is loaded, the distribution of bending stress is increased in tension, which is permissible for timber constructions, and the compression stresses are considerably reduced. Thus, the beam shown in FIGURE 13 has a longitudinally extending web 1, lower reinforcing battens 3 and longitudinally spaced upright timber stiffeners 4, similar to the corresponding parts of the beam of FIGURE 1. In FIGURE 13, however, the upper pair of battens 26, although similar in shape to battens 3, are of greater cross-sectional area and thus of heavier construction than the battens 3, thereby to raise the neutral axis of the beam as shown diagrammatically at Y—Y in FIGURE 13. A similar effect is obtained by applying to a beam of the construction shown in FIGURE 1, a top flange plate 27 (see FIGURE 14) extending from end-to-end of the beam and secured to the upper battens 2 as by nails or by nails and glue.

Another form of asymmetric beam is shown in FIGURE 15, wherein the longitudinal web 1 provided with lower trapezoidal shaped battens 9 and stiffeners 10, as in FIGURE 3, has secured along its upper edges trapezoidal shaped battens 28 which are of heavier construction than the lower battens 9. A further example of an asymmetric beam is illustrated in FIGURE 16, the beam having a longitudinally extending ply-wood web 1 to which upper and lower pairs of reinforcing battens 29, 30 are secured, these each being similar to the battens 28 of the beam shown in FIGURE 15. In the beam of FIGURE 16, the upper flanges are reinforced to raise the neutral axis, by securing a longitudinal flange plate 31 of timber to the upper battens 29.

In FIGURE 17 there is illustrated a composite beam structure which is also of asymmetric form and which includes two beam elements secured together in side-by-side relation. Each beam element has a lower pair of longitudinal reinforcing battens 32, similar to the battens 14 shown in FIGURE 5, and an upper pair of longitudinal reinforcing battens 33, similar to the battens 17 shown in FIGURE 7. The beam elements are secured together along the abutting faces of the adjacent battens, the joints being strengthened by insertion of hardwood tongues 34 in the longitudinal grooves formed along the adjoining battens. Since the upper battens 33 are of heavier construction than the lower battens 32, the neutral axis of the composite structure is again raised substantially as shown at Y—Y.

For the support of a roof and/or ceiling structure of a building, a number of the beams of the kind, for example, according to FIGURE 1, may be arranged in spaced apart and parallel relation as in FIGURE 18, and supported at their opposite ends by two walls (not shown) of the building. The beams have applied thereto a top cladding or roofing deck 35 secured as by nails to the beams. A ceiling 36 is secured to the lower battens of the beams. The beams are spaced according to the nature of the cladding material and the load to be supported. Where, for example, the cladding is of material known as "Stramit," the beams may be located 24 inches on centers, while in the case of 1½ inch wood-wool or rough boarding, the beams may be spaced at 18 or 16 inches on centers, respectively.

In FIGURE 19 there is illustrated a preformed building unit or component which can be used in a roof and/or floor structure, the unit being of box-like form and comprising upper and lower ply-wood panels 37 and 38 secured to a pair of transversely spaced beams A which are of the form shown in FIGURE 1 and which extend longitudinally of the unit. The opposite side edges of the unit are closed by half-elements B and the beams A and B are braced apart along their lower edges by transverse bracing members 39 spaced apart along the length of the unit and shaped at their ends for engagement with the inclined faces of the lower reinforcing battens of the beams. Where the preformed unit is to be employed in the construction of, for example, a roof, the lower cladding 38 may be omitted.

The beams A and B employed in the structure of FIGURE 19 are of symmetrical form. In FIGURE 20 there is shown a preformed box-like unit or component comprising along its two opposite longitudinal sides, half-elements C similar to the half-elements B of FIGURE 19 but of asymmetric form in that the lower reinforcing battens 40 are of heavier construction than the upper battens 41. Between the two half-elements C, there extends longitudinally of the unit, an asymmetric element D having at each side of its web, lower and upper battens 40, 41, the beam elements C and D being braced apart along their upper and lower edges by upper and lower transverse bracing members 42 and 43 respectively, spaced apart along the length of the unit. The unit includes also a top skin or cladding 44 of ply-wood, secured as by glue to the upper battens 41. If desired, a lower skin or cladding may be secured to the unit as at 45 to provide, when a number of the units are assembled in co-planar relation, a ceiling surface.

FIGURE 21 shows a preformed building unit comprising transversely spaced beams A and B similar to those employed in FIGURE 19, the beams being braced apart along their lower edges by transverse members 46 also similar to the corresponding members 39 of FIGURE 19 and arranged in spaced apart relation along the length of the unit. The beams have secured to their upper flanges a preformed light-weight timber frame comprising, as shown in FIGURE 22, longitudinal batten members 47, transverse members 48, and a top cladding 49 of ply-wood. The frame and its cladding serves, in effect, as a stiffening diaphragm which is screwed and glued to the beams, the frame serving to increase the depth and thereby the stiffness of the unit. The battens 47 are of trapezoidal shape in cross-section, the transverse members 48 being shaped at their ends for abutment with the inclined faces of the battens 47. The top frame shown in FIGURE 22 is thus equivalent in construction to a half-beam element, the ply-wood cladding 49 conveniently being 24 inches or 48 inches in width, according to the transverse dimensions of the unit. If desired, each longitudinal batten 47 may be formed along its outwardly directed side face with a groove 50 (see FIGURE 23) for the reception of loose tongues 51 to facilitate the connection of adjacent units. Moreover, the top frame may be strengthened by securing to the battens 47 and the transverse members 48, additional stiffening members as shown at 52 and 53 in FIGURE 24.

Another example of a preformed unit or component is illustrated in FIGURE 25, wherein a frame similar to that of FIGURE 22 is secured to a pair of beams A, the two beams A being spaced inwardly from the longitudinal members 47 of the frame. A series of timber bracing members 54 are secured between the beams A and along opposite sides of the unit there are provided inclined struts 55 extending from the outer reinforcing battens of the two beams to the adjacent longitudinal members 47 of the superposed frame.

FIGURES 26 and 27 illustrate alternative forms of box-beam structures incorporating beam elements A of the form shown in FIGURE 3. In FIGURE 26, the beam element A is secured centrally along a panel 56 of sheet material such as ply-wood and along two opposite longitudinal side edges of the panel there are secured battens 57 trapezoidal in section and similar to the reinforcing battens of the beam element. A timber element or plate 58 is secured along the lower reinforcing battens 3 of the beam element A and between the edges of the element 58 and the battens 57 there are provided ply-wood webs 59 forming the sides of the box-beam. The box-beam of FIGURE 27 has an upper rectangular frame, which is somewhat similar to that illustrated in FIGURE 15 but which has along its opposite sides, longitudinal members 60 of trapezoidal shape in cross-section and arranged, as shown in FIGURE 27, to provide outwardly directed inclined faces 61 extending longitudinally of the structure. The side members 60 are braced apart by transverse battens 62 spaced apart from each other along the length of the structure and to the side members 60 there is secured a top cladding 63 of ply-wood. In FIGURE 27, the beam element A is secured centrally along the underside of the transverse members 62 of the frame, and between the upper battens 2 of the beam element A and the frame, there is interposed a longitudinal member 64. Longitudinally extending ply-wood webs 65 are secured along their upper edges to the inclined faces 61 of the side members 69 and along their lower edges to the opposite side edges of a timber plate 66 secured to the underside of the beam A, to complete the sides of the box-beam.

In FIGURE 28, a number of elements E corresponding to the embodiment of FIGURE 2, are supported between two walls (not shown) of a building and spaced laterally apart from each other at, for example 24 inches on centers, and between each pair of beams there is arranged one or more preformed frames 67 carrying a top skin or cladding 68 of ply-wood. Each frame 67 has longitudinal side members 69 identical in cross-section to the battens 5, 6 of each beam element E. Each frame is also formed with cross-bearers 70 spaced apart therealong. The top frame 67 is thus equivalent in construction to a half beam element corresponding to the beam elements E. The side members 69 are so arranged that the roof deck can readily be assembled on the site by fixing the preformed frames between the beam elements E. For the application of a ceiling to the underside of the beam element E, there are fixed to the beam elements a series of transverse battens 71 which are spaced apart along the length of the beam elements parallel to each other. The battens 71 each carry pairs of triangular blocks 72 arranged to embrace the lower battens 6 of the several beam elements E and to be fixed thereto as by nails. Thereafter, a ceiling surface 73 consisting, for example, of insulating board, is applied to the battens 71.

The construction illustrated in FIGURE 29 involves the use of a series of transversely spaced beam elements F of the form shown in FIGURE 12. The beam elements F are supported between the walls (not shown) of a building and arranged in parallel and laterally spaced apart relation. Between each pair of beam elements there is secured one or more preformed roofing units having longitudinal and transverse frame members 74 and 75 respectively, secured to a top cladding 76 of ply-wood. The roofing units are similar to those provided in FIGURE 28 but the longitudinal members 74 are of generally trapezium shape in section to provide increased depth and greater rigidity. Each beam element is further strengthened by securing along the underside thereof, a longitudinal fillet 77 of timber. For the support of a ceiling surface 78, there are provided between each pair of beams F a series of batten members 79 spaced apart longitudinally of the beam elements and formed at their opposite ends with dove-tail shaped cut-outs 80 to enable said members readily to be engaged with the lower reinforcing battens 3a of the beam elements. It will be appreciated that all of the component parts required in the assembly of the constructions illustrated in FIGURES 28 and 29 may be preformed and readily secured together on the site.

The embodiment illustrated in FIGURE 30 comprises a beam element indicated generally at 81 and of the kind shown in FIGURE 1, the beam element being strengthened by top and bottom timber plates 82 and 83 respectively, which extend from end-to-end of the beam element and are secured to the upper and lower flange surfaces thereof. The plates 82, 83 increase the structural properties of the beam element so that it can be used on a greater span. The plates 82, 83 are formed along their opposite edges with rabbets 84 providing along the beam grooves for the reception of tongued ends of upper and lower timber nogging elements 85 and 86. The nogging elements extend transversely between adjacent beam structures and are spaced apart along such structures so that the upper elements 85 can support roof cladding between the beam structures and the lower elements 86 can support ceiling panels, as indicated at 87.

FIGURE 31 illustrates a modification of the embodiment of FIGURE 30, wherein there is interposed between the flanges of the beam element and the adjacent top and bottom plates 82 and 83, upper and lower longitudinal reinforcing plates of timber, as shown at 88 and 89 respectively. If desired, the upper plate 88 may be tapered in thickness along its length so that when a number of the beams are erected in the formation of a roof, the roof cladding supported thereby will slope in accordance with the taper of the plates 88, to provide an inclination for drainage purposes. It will be appreciated that beam elements of the kind shown in FIGURES 3, 5 and 7, or box-beam elements of the kind shown for example, in FIGURES 9, 10 and 11, could be incorporated in a structure similar to that described with reference to FIGURE 30 or FIGURE 31.

Further examples of timber beam structures are shown in FIGURES 32 to 36. In FIGURE 32, a box-beam structure comprises two half-beam elements 90, 91 each similar to the element illustrated in FIGURE 8 and so arranged that the webs 1 thereof define the opposite longitudinal side walls of the structure and the upper and lower reinforcing battens 2, 3 are directed inwardly and spaced laterally apart by upper and lower longitudinal spacing battens 93, 94. The structure includes also top and bottom timber plates 95 and 96 respectively extending from end-to-end of the structure and secured to the upper and lower pairs of reinforcing battens 2, 3. In FIGURE 32, the webs 1 have marginal portions above and below the adjacent battens 2 and 3 respectively and fitted into corresponding longitudinal rabbets or recesses formed along the edges of the top and bottom plates 95, 96.

FIGURE 33 illustrates a composite beam structure comprising two beam elements, each as shown in FIGURE 5 and secured together in side-by-side relation, the joints between the abutting faces of the two beam elements being located by insertion of timber tongues 97 in the grooves 15 formed along the adjoining edges of the co-operating reinforcing battens 13, 14 of the two elements.

The box-beam shown in FIGURE 34 is assembled from two half-beam elements each including a web having on one side only upper and lower reinforcing battens 17, 18 corresponding to those shown in FIGURE 7, the two beam elements being arranged with their webs back-to-back and spaced laterally apart by upper and lower longitudinal timber plates 98, 99 the latter being secured as by glue to the webs of the beam elements. A similar box-beam structure is shown in FIGURE 35, the two half-beam elements here being arranged with the reinforcing battens 17, 18 directed toward each other and fixed to upper and lower longitudinally extending spacer plates 100, 101 formed along their edges with grooves which register with the corresponding grooves in the reinforcing battens 17, 18 for the reception of fixing tongues 102. The structure may be further strengthened by securing thereto top and bottom timber reinforcing plates as shown at 103. FIGURE 36 illustrates a composite beam structure comprising a beam element of the kind shown in FIGURE 7, there being secured along each side of that element, a corresponding half-beam element. Fixing tongues 102a are provided in the grooves formed in the co-operating battens 17, 18.

FIGURE 37 illustrates a roof and gutter construction comprising a plurality of laterally spaced beam elements 104 of the kind shown in FIGURE 3, the beam elements having secured thereto roof cladding 105 of sheet material, such as ply-wood and gutter components 106. Each gutter component 106 comprises a half-beam element having a ply-wood web 107, which forms the base of the gutter and reinforcing battens 108 secured along the opposite edges of the web. The transverse stiffeners, such as those shown at 10 in FIGURE 3, are omitted from the gutter components, to provide a clear passage for drainage purposes. The structure is completed by applying sheet material 109, such as roofing felt or sheet metal, to the exposed surfaces of the cladding and the gutter components.

The handling of very long beams on a building site is not always practicable but beam elements, such as those described with reference to FIGURES 1 to 7, can readily be adapted to permit two or more beam elements to be coupled together end-to-end on the site. For example, FIGURE 38 shows the end portions of two beam elements each of the kind shown in FIGURE 7. The end-most transverse stiffeners 10a of the beam elements are set-back by 6 inches or more from the adjacent extremities of the beam elements to provide recesses for the reception of splicing plates 110 of timber at opposite sides of the two elements. The splicing plates are shaped to engage the webs and the contiguous inclined faces of the reinforcing battens 17, 18 of the two beam elements, and are drawn tightly together by bolts 111 so that the end portions of the two beam elements are clamped firmly in position. Another example of connecting two or more beams to form a continuous span, is shown in FIGURES 40 and 41, each beam here consisting of a composite beam structure of the kind shown in FIGURE 33. The endmost transverse stiffeners 10a at the outer sides of the two beams are, as in FIGURE 38, set-back to provide recesses adapted to accommodate at each side of the two beams, a splicing plate 112 comprising a ply-wood web 113 secured to an internal frame consisting of upper and lower battens 114 and transverse battens 115. The battens 114 are of trapezium or wedge shape to provide inclined faces engageable with the corresponding inclined faces of the outer reinforcing battens 13, 14 of the two beams. The two splicing plates 112 are tightened by bolts 116 to clamp the end portions of the two beams together. It is necessary that, in the formation of continuous spans as described with reference to FIGURES 38 and 39, or FIGURES 40 and 41, the adjoining beams should be coupled together at locations of zero bending. The described modes of coupling of the beams permit spaces to be left between the ends of the adjacent beams to provide tolerances for taking up, within limits, variations or errors in site dimensions, during assembly of the preformed beams.

The foregoing serves to indicate the wide range and variety of beams and wooden constructions which may be fabricated from standard sheets of ply-wood and lengths of timber of a relatively few standard sizes in cross-section. This simplifies considerably the purchase and maintenance of stock materials and thereby facilitates and provides economy in the manufacture of the structures.

The preformed beam elements, and components or units incorporating such elements herein described, have many applications in building construction for roof, floor and ceiling structures. For example, beam elements of the kind shown in FIGURE 3, can be used as purlins to support the rafters of tiled pitched roofs and to carry the roof loads between the supporting walls. Such beam elements may also be arranged to span horizontally between the walls of a building and the beam elements may be disposed with their webs either in a vertical plane, or in any plane inclined to the vertical, for the support of a roof of asbestos or other sheeting material. Moreover, half-beam elements may be employed in the erection of shuttering for use in reinforced concrete constructional work.

Half-beam elements may also be used for temporary staging or platforms as employed, for example, in building maintenance work such as painting. Thus, referring to FIGURES 42 and 43, a decking unit for erection of a light-weight maintenance staging or platform, comprises a half-beam unit including two spaced apart longitudinal battens 117 secured to the underside of a ply-wood web 118, there being stiffening members 119 extending transversely between the battens 117. To the top of the web, there are secured longitudinally spaced transverse strips 120 of plywood or hardwood, arranged to serve as footgrips. The battens 117 are of trapezium shape in section and formed with longitudinal grooves 121 along which extend steel reinforcements, such as high-tensile steel wires 122 secured at their opposite ends to transverse mild steel plates 123 fixed to the ends of the unit.

I claim:
1. A beam structure comprising a beam element including a longitudinal web of plywood having opposite longitudinal edges, a first pair of longitudinal reinforcing members extending along one longitudinal edge of said web, a second pair of longitudinal reinforcing members extending along the opposite longitudinal edge of said web, the reinforcing members of each pair being secured to opposite side faces of said web, each reinforcing member being a one piece solid timber element of trapezoidal shape and indentical to the other reinforcing members, each of said reinforcing members cooperatively defining with another a substantially rectangular cross-section, each of said reinforcing members being of trapezoidal shape in cross-section and including an outer edge face presenting along the adjacent edge of said web, a longitudinal flange surface which extends laterally from and is co-planar with said adjacent edge, a laterally outer side face parallel to said web, and an inner edge face inclined laterally outwardly from said web towards said outer edge face such that each said trapezoidal reinforcing member is in contact with said web along the longer of the parallel faces of the trapezoidal member, said beam element further comprising at each side of said web, spaced apart transverse timber stiffening members, each of said stiffening members being substantially perpendicular to the associated longitudinal reinforcing members and having oppositely inclined end faces secured in abutting relation to the correspondingly inclined inner edge faces of said associated longitudinal reinforcing members, a generally rectangular panel structure secured to the flange surfaces of said first pair of reinforcing members, said panel structure extending longitudinally of and in a plane perpendicular to said web and having lateral portions located symmetrically beyond opposite side faces of said web, said beam structure further comprising two opposite longitudinal side wall parts of plywood, each side wall part being secured along one longitudinal edge thereof to the adjacent longitudinal edge of said panel structure and, along the other longitudinal edge thereof, to the adjacent reinforcing member of said second pair.

2. A beam structure comprising a longitudinal web, said web having longitudinally extending edges, pairs of longitudinal reinforcing members extending on opposite sides of said web adjacent both said edges, each reinforcing member being a one piece solid timber element of trapezoidal shape and identical to the other reinforcing members, each of said reinforcing members cooperatively defining with another a substantially rectangular cross section, each of said reinforcing members having parallel and non parallel sides of unequal lengths, the longer of the parallel sides being on and coextensive with the web, the shorter of the non parallel sides extending laterally of the web and coextensive with the corresponding edge thereof, the other of the non parallel sides of the reinforcing member extending laterally of the web in inclined fashion towards the first said non parallel side, a longitudinal panel coupled to one of the pairs of reinforcing members and extending substantially perpendicularly of the web an equal distance on either side thereof, said panel having opposite edges, a further reinforcing member identical to the first said reinforcing members coupled to the panel at the opposite edges thereof and extending longitudinally thereof, and inclined further webs extending between the further reinforcing members and the other of the pairs of reinforcing members to form a substantially triangular box beam.

References Cited in the file of this patent

UNITED STATES PATENTS

| | | |
|---|---|---|
| 1,347,084 | Eggleston | July 20, 1920 |
| 2,230,628 | Sahlberg | Feb. 4, 1941 |

FOREIGN PATENTS

| | | |
|---|---|---|
| 497,292 | France | Sept. 9, 1919 |
| 21,038 | France | Nov. 26, 1919 |
| 900,182 | France | Sept. 18, 1944 |
| 124,866 | Sweden | May 10, 1949 |
| 812,834 | Germany | Sept. 6, 1951 |
| 283,661 | Switzerland | Oct. 16, 1952 |
| 908,188 | Germany | Apr. 1, 1954 |
| 542,053 | Canada | June 4, 1957 |
| 1,158,911 | France | Feb. 3, 1958 |
| 328,681 | Switzerland | May 14, 1958 |